April 3, 1956 M. J. CARTER 2,740,339
PHOTO-FLASH UNIT
Filed June 6, 1951 2 Sheets-Sheet 1

INVENTOR.
MELVILLE J. CARTER
BY
ATT'YS

April 3, 1956  M. J. CARTER  2,740,339
PHOTO-FLASH UNIT

Filed June 6, 1951  2 Sheets-Sheet 2

INVENTOR:
MELVILLE J. CARTER
BY
Rummler, Rummler & Snow
ATT'YS

United States Patent Office 2,740,339
Patented Apr. 3, 1956

2,740,339

PHOTO-FLASH UNIT

Melville J. Carter, Chicago, Ill.

Application June 6, 1951, Serial No. 230,193

3 Claims. (Cl. 95—11.5)

This invention relates to photographic-flash devices, and particularly to improvements in stroboscopic or repeating flash units for electronically operated flash lamps.

The main objects of this invention are to provide an improved electronic flash device which is self-synchronized with substantially every type of camera shutter-switch; and to provide an improved photographic-flash device of more simple construction, less weight, and smaller size than those heretofore produced.

Other objects of this invention are to provide an improved electronic photo-flash unit that is wholly shockproof, and which will afford the maximum of safety for any user; to provide such a device in which all high voltage circuits and connections are wholly enclosed within a shockproof case; and to provide such a device in which all external electrical connectors are of low voltage.

Further objects are to provide an electronic flash lamp unit wherein the most simple electronic power circuit may be employed and wherein the electronic circuit for firing the flash lamp is triggered by an independent low voltage circuit operated by the camera shutter-switch; to provide such a device in which the flash lamp triggering circuit is powered by a low voltage flashlight battery; to provide such a device in which only the current and voltage of a flashlight battery is transmitted through the camera shutter-switch; and to provide such a device in which control of the electronic circuit to flash the lamp is performed by a miniature, extremely rapid relay powered by a separate low voltage battery circuit.

Still further objects of this invention are to provide an improved electronic flash lamp unit which may be readily converted to utilize and fire the ordinary gas filled or wire filled, combustion type, flash bulbs; to provide an improved electronic flash lamp circuit in which a simple plug-in adapter may be used to convert the flash unit for use with ordinary combustion type flash bulbs; and to provide such a circuit having a battery operated triggering means which will directly fire a combustion type flash bulb, upon operation of the camera shutter, wholly independent of operation of the electronic circuit.

A specific embodiment of this invention is shown in the accompanying drawings in which.

Figure 1:
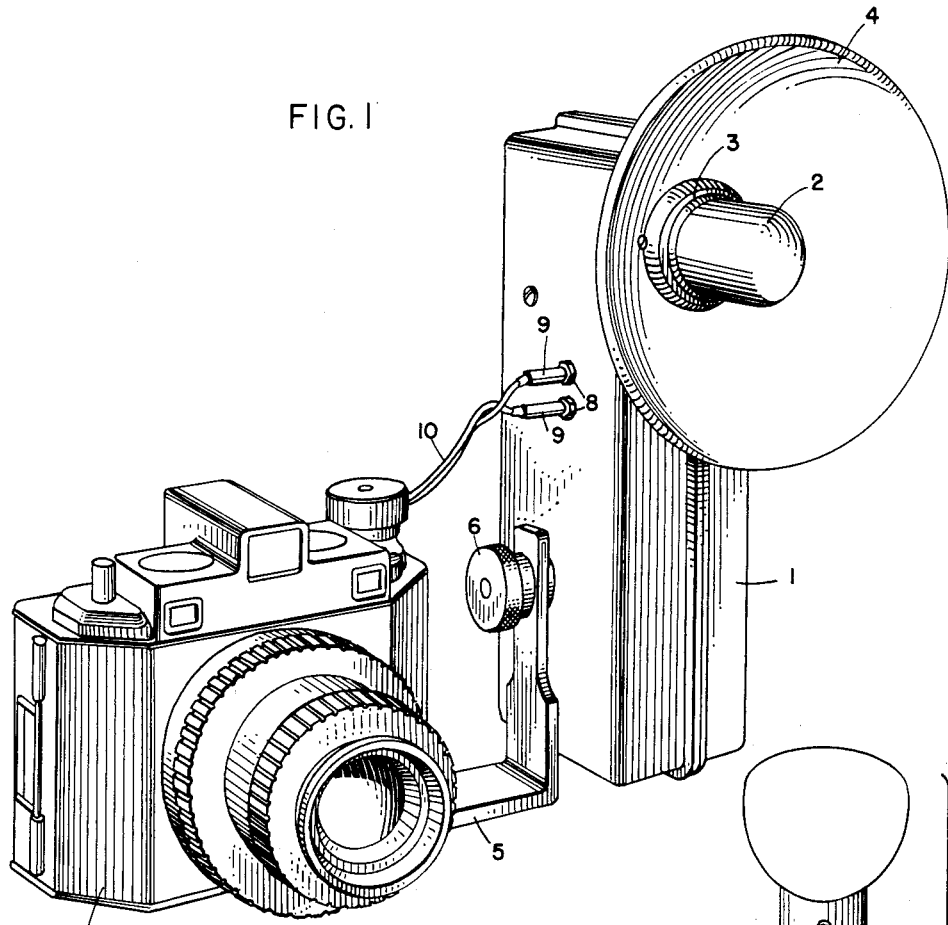
Figure 1 is a perspective view of the improved photoflash unit mounted with a camera on a common supporting bracket.

In the form shown in the drawings, the improved photoflash unit comprises a molded dielectric casing 1, preferably formed in two halves, which provides a box within which all of the electrical components of the unit, except the flash bulb, are mounted and housed. The flash tube tube 2 is mounted in a suitable receptacle 3, disposed in the upper end of the casing 1, and projects forwardly from the casing through a suitable reflector 4 which is mounted directly onto the casing 1 by any convenient means.

As shown, the flash unit casing is adapted to be mounted on the upwardly projecting arm of an angle supportbracket 5, by means of a screw 6, and the laterally projecting arm of the angle bracket 5 is adapted to receive and rigidly mount a camera 7 in the same manner, both the camera and the flash unit having the usual internally threaded screw socket, not shown, for this purpose. Also, the casing 1 is provided with a pair of outwardly opening jacks 8 adapted to receive the plugs or tips 9, of a pair of wires 10, which lead in the usual manner from a suitable connection with the camera shutter-switch.

Figure 2:
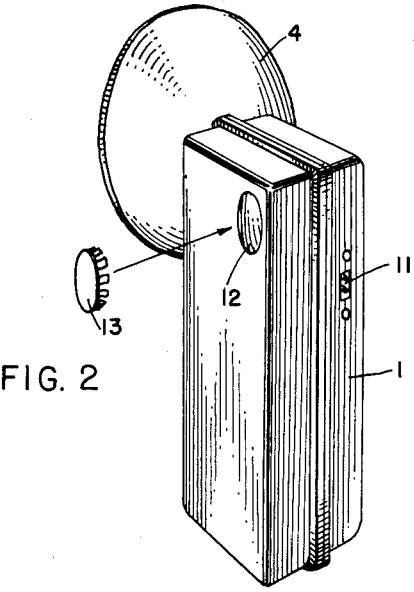
Fig. 2 is a perspective rear view of the flash unit showing the plug-in receptacle for connection with an external power source and showing the opening, together with a closure cap therefor, for inserting and removing a flashlight battery.

As shown in Fig. 2, a receptable 11 is provided in the rear side of the casing 1 to receive a plug connector, not shown, which leads from a suitable power source such as the usual 110 volt, 60 cycle, house lighting circuit. This same receptacle 11 may also be used for connecting a battery pack, not shown, to power the electronic circuit in those cases where an A. C. house lighting circuit is not available. In such case the battery pack will be of the usual construction employing six flashlight batteries, a vibrator to provide a pulsating current, and a transformer. As shown, the receptacle 11 preferably contains the male prongs of the connection so that the female member will be on the conductor leading to the power source.

Figure 4:
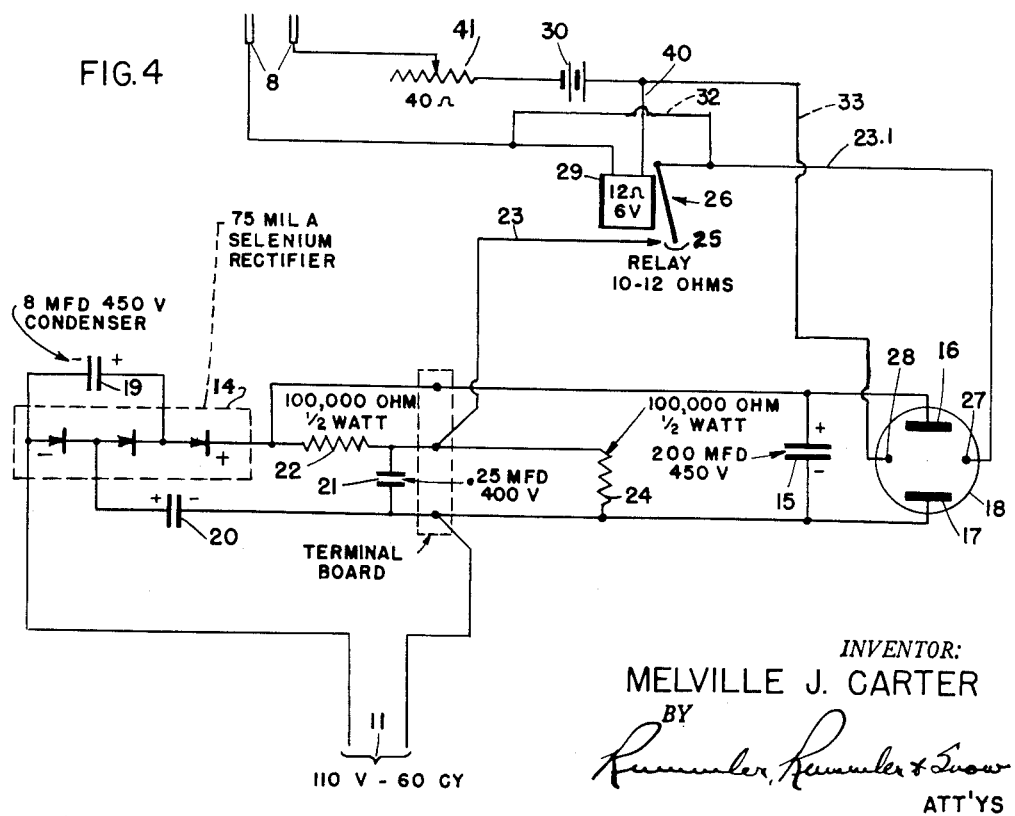
Fig. 4 is a diagrammatic view of the electrical circuit for operating the improved unit.

As shown in Fig. 4, the electronic circuit for energizing the electronic flash tube is of more or less conventional form, designed to rectify the ordinary 110 volt, 60 cycle current received from a lighting circuit, and to step up the voltage of such power source to apply a potential of about 440 volts between the anode and cathode terminals for the flash tube; and the firing of the tube is controlled by a connection from the electronic power circuit, to the grid terminal of the tube socket, adapted to apply approximately 440 volts to the tube grid. The grid connection leads through the contacts of a circuit closing relay which is actuated by a battery circuit that is wholly separate from the electronic circuit for the tube; and the battery circuit is in turn controlled by the usual camera shutter-switch which is built into the camera shutter mechanism.

In the circuit of Fig. 4, the power for the electronic portion is supplied through the terminals of the receptacle 11 and the alternating current is rectified by a series of three 75 milliampere selenium rectifiers 14, which are connected in tripler circuit to step-up the voltage from 110 volts to approximately 440 volts and to charge a 200 mfd., 450 volt condenser 15 connected across the anode and cathode terminals 16 and 17, respectively, of a 4-prong tube receptacle or socket 18. This circuit includes a pair of 8 mfd., 450 volt, smoothing condensers 19 and 20, for steadying the charge developed by the rectifiers, and a .25 mfd. 400 volt tubular smoothing condenser 21, all of which are connected in the circuit in the usual manner. The circuit also includes a 100,000 ohm, ½ watt smoothing resistor 22 in the grid feed line 23, and a second 100,000 ohm, ½ watt primary load resistor 24, connected between the grid lead and the ground side of the circuit for maintaining the voltage on the main firing condenser 15. The grid lead 23 is connected in the usual manner between the resistors 22 and 24, and leads through the contacts 25 of a relay 26 to the grid terminal 27 of the tube socket 18.

As shown, the tube socket 18 is of the ordinary type adapted to receive a 4-prong tube base, only three of the terminals, 16, 17 and 27 being employed in the operation of the flash tube. The fourth terminal 28 is dead or neutral, in so far as the electronic circuit is concerned.

The electronic circuit and the operation of the flash tube by means thereof, are conventional and in accordance with the recommendations of the tube manufacturer, the tube 2 being of a gaseous ionizing type, which achieves intense light output by temporary electronic disturbance of inert gas molecules. The firing of this kind of tube is controlled by the tube grid, which must have a predetermined potential applied to it before the arc or flash between the anode and cathode can be effected by virtue of the voltage differential between the two elements. Thus, closing of the relay contacts 25, to complete the connection from the electronic circuit to the grid by way of the grid lead 23—23.1, will cause the tube to fire through discharge of the condenser 15. The condenser 15 recharges very rapidly. However, it is a characteristic of such tubes that firing of the tube cannot reoccur until the grid connection is opened and then again closed.

This opening and closing of the grid circuit is the function of the camera shutter-switch, in so far as operation of the electronic or stroboscopic flash tube circuit is concerned, and it is a purpose of this invention to perform this function is such a manner that a minimum current and voltage will be passed through the camera shutter-switch; and so that synchronization of the electronic circuit tube-firing operation, with respect to the opening of the camera shutter, will be automatic. In the electronic or stroboscopic flash lamp circuits heretofore used, it is necessary to incorporate variable resistances to regulate the timing of the relay operation, for closing the grid circuit to the flash tube, in order that the flash tube will fire when the shutter is at its full open position rather than too soon or too late. In such other circuits synchronization difficulty usually arises from the fact that the grid circuit operating relay is powered from the electronic circuit by a connection running directly to the camera shutter-switch, and the operation of the circuit, in so far as timing is concerned is directly influenced by both the nature of the shutter-switch and the variable length and resistance of the leads to and from the shutter-switch. Also, in such circuits the load carried by the camera shutter-switch, for operation of the relay, is such that the shutter-switch, which is a very delicate mechanism, rapidly deteriorates or burns. This deterioration effects the timing of the operation of the flash lamp but also, ultimately, necessitates expensive repair or replacement of the shutter-switch.

As shown by Fig. 4, the function of opening and closing the grid circuit 23—23.1 for the flash is performed by means of an extremely small fast operating relay 26. This relay is powered by a battery circuit which includes the camera shutter-switch, not shown, and which is wholly independent of the influence of the electronic circuit that operates the flash tube. Preferably, the relay 26 is a construction having a very light weight armature and a 10 to 12 ohm, 6 volt, operating coil 29; and this coil is powered by a five ampere, size AA, pen-type flashlight battery 30, connected in series with the jacks 8 leading to the camera shutter-switch. Also, the coil 29 of the relay is wound with fine wire so as to have a very small inductance and provide a very high armature operating speed.

Preferably the time for relay operation should be less than ten milli-seconds, and since the flash tube fires instantly that the grid circuit is closed by the relay, such time for relay operation is well within the time that the camera shutter remains in maximum open position for the usual shutter speeds used for flash photography and with ordinary shutter-switch constructions.

It will thus be seen that since the operation of the relay is not in any way influenced by the electronic flash tube circuit, the relay will always operate at its maximum speed and will close the grid circuit 23—23.1 of the flash tube while the shutter is at its maximum open position, and will fire the flash tube within the time that the shutter remains open at ordinary flash-photography speeds. Thus, the possibility for the relay to operate before the shutter has reached its full open position or after the shutter has begun to close, because of resistances in the electronic circuit connections, or variations in shutter-switch constructions, is entirely obviated; and any problem of synchronizing the relay operation, by adjusting resistances in the power lead to the relay coils, as is necessary with prior electronic flash devices, is completely eliminated.

Figure 5:
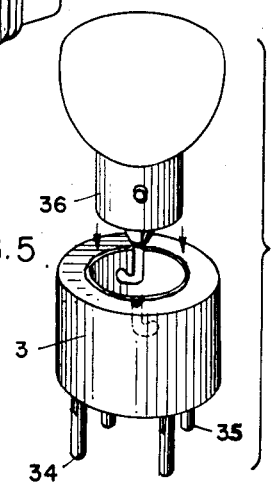
Fig. 5 is a perspective view of an adapter and a combustion type flash bulb for converting the flash unit to ordinary flash bulb use.

Because my improved photo-flash unit operation is controlled by a battery circuit, independent of any influence from the electronic flash tube circuit, I have been able to adapt the unit for use with ordinary combustion-type flash bulbs. This I do by providing an adapter 31 shown in Fig. 5, which utilizes the terminals 28 and 27 of the electronic unit socket 18 to complete a firing circuit through the adapter when a flash bulb has been inserted therein.

As shown the adapter 31 is made with a standard 4-prong tube base which will fit the socket 18 and a shell of a size to fit the base of the ordinary flash bulb, is secured within the adapter body and suitably connected, electrically, with the adapter prongs 34 and 35 which are located to engage the terminals 27 and 28 of the socket 18. Thus a flash bulb 36, placed in the adapter, will complete a circuit between the terminals 27 and 28 and will be fired by a current passing through the said terminals.

As shown in Fig. 4, the two terminals 27 and 28 are connected in series with the battery 30 and the camera shutter-switch jacks 8, by means of a lead 32 which connects the shutter-switch side of the relay circuit into the grid lead 23.1, and by a lead 33, which connects the electronically neutral terminal 28 with the opposite side of the relay 26. Thus when the flash bulb adapter 31, is inserted into the tube socket 18 with its prongs 34 and 35 engaging the terminals 27 and 28, and when a flash bulb 36 is inserted in the adapter socket 31, closing of the shutter-switch across the jacks 8 will complete a circuit between the battery and the flash bulb so as to fire the flash bulb by the current from the battery alone. Under these conditions the external power source connection to the receptacle 11 is, of course, disconnected and operation of the relay 26, which will occur when the shutter-switch is closed because the relay coil is in the battery circuit, will have no effect in so far as the electronic components of the flash unit are concerned. Also, it will be apparent that when the flash bulb adapter 31 is not in use, and when the flash unit is operated to fire an electronic flash tube, the presence of the battery connections 32 and 33 to the flash tube socket 18 will have no effect whatsoever upon the operation of the electronic circuit because the terminals 27 and 28 in that case are at dead or open ends.

Figure 3:
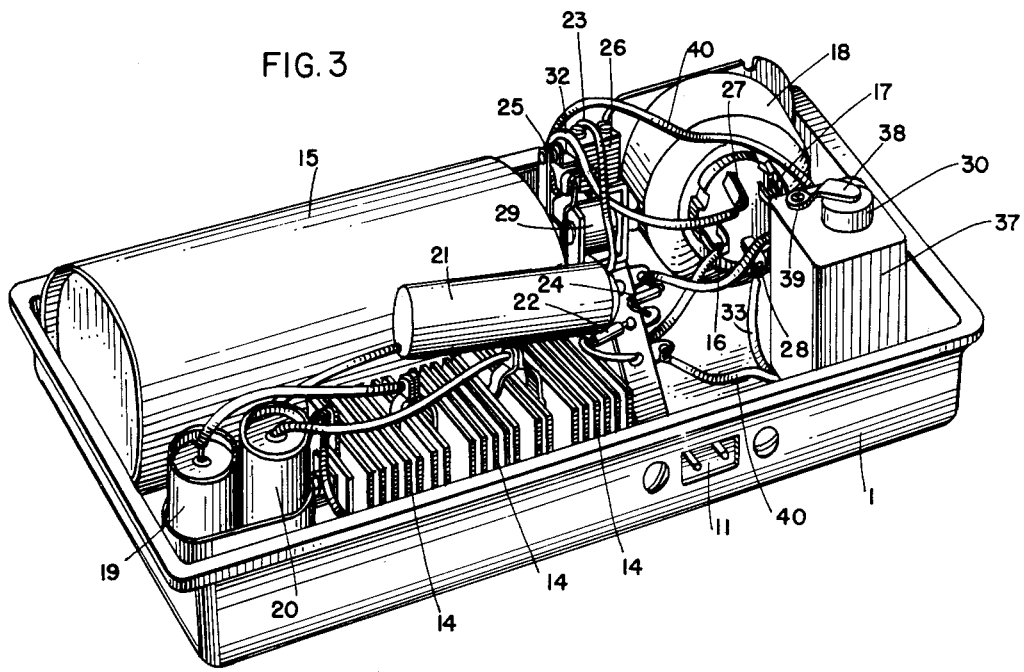
Fig. 3 is a perspective view showing the flash unit casing with a half-section removed to disclose the arrangement of the electrical components of the flash tube operating circuit.

As shown in Fig. 3, all of the essential operating components of my improved photo-flash unit are mounted in a one-half section of the casing 1, and each element is firmly fixed or cemented to the casing so that it cannot be displaced from its proper position by shock or jar during handling of the unit. The only removable element is the battery 30 which, as shown, is disposed in a tubular socket formed in a holder body 37 of dielectric material integral with the casing 1. As shown, the battery 30 is held in place by a spring contact clip 38, which is pivotally secured to the holder body 37 by means of a screw or rivet 39, the battery lead 40, which connects with the coil of the relay 26, being soldered to the spring clip 38. The opposite terminal of the battery 30 rests against a contact, not shown, located at the other end of the holder body 37, which contact leads to one of the shutter-switch jacks 8. Thus when it is desired to remove or replace the battery, it is only necessary to swing the spring clip 38 to one side, extract the battery from its socket and replace it with a fresh battery. This operation is done through the opening 12 in the side wall of the casing after the plug or closure cap 13 has been removed, the opening 12 being located so as to be directly opposite the end of the battery which is engaged by the retaining clip 38.

In the operation of the unit with an electronic flash tube, it is only necessary to plug in the leads from the camera shutter-switch, by means of the jacks 8, and then to plug in the connector, from the 110 volt 60 cycle power source, at the receptacle 11. The main firing condenser 15 of the electronic circuit then becomes charged in a matter from two to three seconds, and the unit is ready to operate to flash the electronic tube 2 upon operation of the camera shutter to momentarily close the camera shutter-switch and complete the battery circuit through the shutter-switch jacks 8. Closing of the battery circuit operates the relay 26 to close the contacts 25, which instantly charges the grid of the tube, through the terminal 27, and causes the tube to fire. Since the shutter-switch is a momentary contact device and opens immediately after operating, the grid circuit is instantly broken so that the flash tube can immediately condition itself for a second flash operation. The conditioning of the flash tube for a repeat flash is practically instantaneous and, since the time required to recharge the firing condenser 15 is extremely small, the flash tube may be re-fired as rapidly as possible commensurate with ordinary camera operations. The condenser 15 does require a short time to recharge. However, because of its size it is capable of producing five or more rapidly repeated flashes of the flash tube, such as might be required with a sequence camera having an automatic film transport mechanism. With such repeated operation of the flash tube the tube may lose some of its brilliancy due to depletion of the charge in the condenser 15. However, a pause of two to three seconds is all that is necessary to allow the condenser 15 to become fully recharged for maximum performance of the flash tube.

In some cases it may be desired to operate or trigger the improved photo-flash unit by means of a standard flash-gun camera attachment, instead of a shutter-switch that is built into the camera shutter mechanism, and in such cases the resistance of the relatively long leads between the flash unit jacks 8 and the switching mechanism of the flash-gun may affect the speed of operation of the relay 26 so as to necessitate a synchronizing adjustment. For this purpose I may provide a potentiometer 41 in the relay operating circuit, as shown in Fig. 4. This, however, is an extreme condition and in those cases where the triggering circuit is operated by a shutter-switch built into the camera shutter mechanism, and where the leads to the camera switch are short, no synchronizing adjustment of the total resistance in the relay coil circuit is necessary.

It will be understood that the sizes of the various components of the electronic circuit herein shown and described have been specified for purposes of illustration only and not by way of limitation, and that the several components may be varied in size and capacity to suit the needs of the particular stroboscopic flash tube that may be used. Ordinarily the electronic circuit most suitable will be specified by the tube manufacturer.

The main advantages of this invention reside in its utility with substantially every type of camera having built-in shutter-switches for operation of electric flash device, and particularly in the fact that the improved photo-flash unit can be readily and successfully operated by the cheapest of cameras having flash switch mechanisms; and in the fact that because of the great brilliance of light obtained from electronic flash tubes, and the extremely short duration of the flash, the improved unit can be employed with cameras having fixed shutter speeds, and only one or two stop openings. Other advantages reside in the fact that for ordinary flash photography shutter speeds, and with substantially all types of shutter mechanisms, no synchronization of the flash unit with respect to the operation of the camera shutter is necessary.

Further advantages reside in the fact that the improved photo-flash unit is completely shockproof since all high voltage circuits and connections are contained within a sealed dielectric housing, all unenclosed connections on the exterior of the housing being of harmless, very low voltage; in the fact that only the voltage and current from a small flashlight battery is employed in the external leads to the camera shutter-switch whereby danger of shock or burning of the shutter-switch contacts is completely eliminated; and in the fact that because the flash triggering circuit is powered directly from a flashlight battery and wholly independently of the electronic tube circuit, synchronization adjustments for proper timing of the relay operations are unnecessary and the improved unit will operate with shutters having either M (foil) or F (gas filled) settings, thus substantially making X shutters (zero delay) out of almost all cameras manufactured at the present time.

Still further advantages reside in the fact that the improved unit may be readily adapted for operation with ordinary combustion type flash bulbs, and will fire such bulbs without any external power connections either to an alternating current power source or a battery pack; and in the fact that because of the simplicity of the circuit arrangements and components within the unit, the improved flash unit is of less than half the size, and materially less than half the weight, of other electronic flash devices and can be manufactured and sold at a relatively low price.

Although but one specific embodiment of this invention is herein shown and described, it will be understood that details of the construction and circuit arrangement shown, may be altered or omitted without departing from the spirit of this invention as defined by the following claims.

I claim:

1. In a grid controlled stroboscopic lamp circuit having a four-terminal lamp socket, circuit connections to two terminals of said socket for power supply to a grid controlled lamp inserted therein, a lead from said circuit to a third terminal of the socket for energizing the grid of a grid controlled lamp to fire the same, and a relay having normally open contacts connected in series in said lead and having an operating coil, a low voltage means connected to said coil for actuating said relay independently of the lamp power circuit to close said contacts, means for connecting said low voltage means and relay coil in series with a camera shutter-operated flash switch, and branch connections from said low voltage means on each side of said relay coil leading to the third and fourth terminals respectively of said socket; whereby closing of the camera shutter operated flash switch will complete a circuit through and fire a low voltage flash bulb mounted in said socket and having series connection with the third and fourth terminals only of said socket.

2. In a grid controlled stroboscopic lamp circuit having a four-terminal lamp socket, circuit connections to two terminals of said socket for power supply to a grid controlled lamp inserted therein, a lead from said circuit to a third terminal of the socket for energizing the grid of a grid controlled lamp to fire the same, and a relay having normally open contacts connected in series in said lead and having an operating coil, a low voltage means connected to said coil for actuating said relay independently of the lamp power circuit to close said contacts, means for connecting said low voltage means and relay coil in series circuit with a camera shutter-operated flash switch, branch connections from the said low voltage circuit on each side of said relay coil leading to the third and fourth terminals respectively of said socket, and an adapter in said socket having a pair of conductor elements engaging the third and fourth terminals of said socket, said conductor elements leading to a pair of contact means in said adapter for engaging the terminals of a low voltage flash bulb fitted into said adapter.

3. In a grid controlled stroboscopic lamp circuit having a four-terminal lamp socket, circuit connections to two terminals of said socket for power supply to a grid controlled lamp inserted therein, a lead from said circuit to a third terminal of the socket for energizing the grid of a grid controlled lamp, and a relay having normally open contacts connected in series in said lead and having an operating coil wound for less than twelve ohms, a low voltage battery connected to actuate said relay coil independently of the lamp power circuit to close said contacts, means for connecting said battery and relay coil in series circuit with a camera shutter-operated flash switch, and branch connections from said series circuit each side of said relay coil leading to the third and fourth terminals respectively of said socket; whereby closing of a shutter-operated camera flash switch will fire a low voltage flash bulb mounted in said socket and having series connection between the third and fourth terminals of said socket.

References Cited in the file of this patent

UNITED STATES PATENTS

| | | |
|---|---|---|
| 2,324,075 | Gillon et al. | July 13, 1943 |
| 2,358,796 | Edgerton | Sept. 26, 1944 |
| 2,408,764 | Edgerton | Oct. 8, 1946 |

OTHER REFERENCES

American Photography, vol. 45, No. 4, April 1951, pages 209 to 215 inc. Published in New York city.